Jan. 22, 1924.  1,481,632
J. W. TATUM
MILLING MECHANISM
Filed March 30, 1921
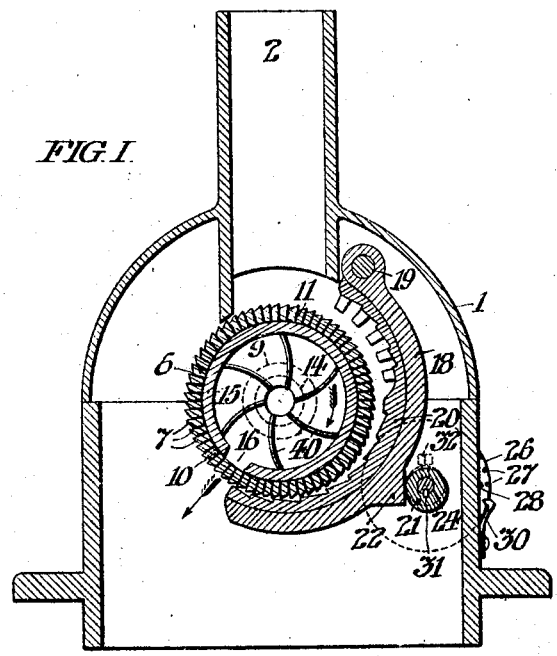
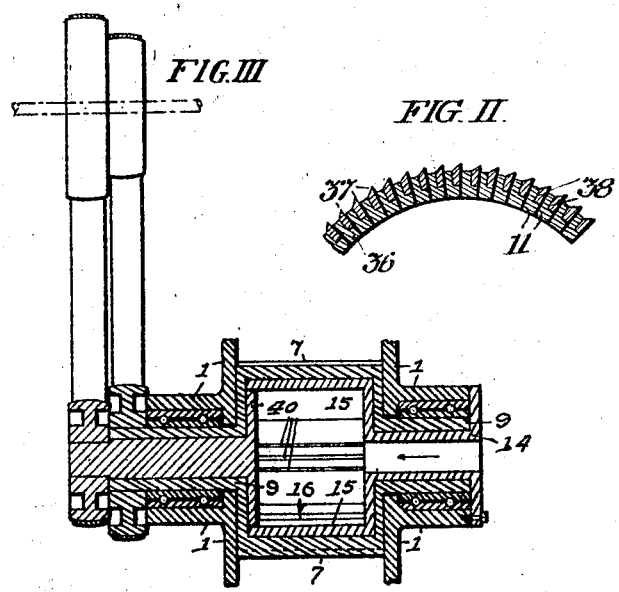
INVENTOR:
JOHN W. TATUM, Patented Jan. 22, 1924.

1,481,632

UNITED STATES PATENT OFFICE.

JOHN W. TATUM, OF FALLSINGTON, PENNSYLVANIA.

MILLING MECHANISM.

Application filed March 30, 1921. Serial No. 456,821.

*To all whom it may concern:*

Be it known that I, JOHN W. TATUM, a citizen of the United States, residing at Fallsington, in the county of Bucks and State of Pennsylvania, have invented a certain new and useful Improvement in Milling Mechanism, whereof the following is a specification, reference being had to the accompanying drawing.

My invention is particularly applicable to means for grinding materials which are of such a nature that the grist tends to adhere to the grinding mechanism. For instance, coffee. Coffee berries contain a complex of oils and gum which exude from the crushed particles thereof, tending to cause them to adhere to each other and to the opposed members of the milling couple.

It is usual to provide a coffee mill with some sort of brushing mechanism to dislodge the coffee débris from the teeth of the milling roller. Such devices are not only costly to construct and maintain, but particles of the brush element are inevitably carried into the grist, to the detriment of the latter. Moreover, the heat generated by the grinding operation is augmented by the friction of the brushing element upon the milling roller to the detriment of the coffee in that the natural aroma and flavor of the latter are dependent upon the retention of certain volatile elements of the complex aforesaid which are volatilized and dissipated by the heat induced by the ordinary grinding and cleaning operations aforesaid.

Therefore, it is the object and effect of my invention to provide means for cleaning the teeth of a milling roller without the employment of any brushing element and to also refrigerate said roller so as to maintain it and the coffee at atmospheric temperature.

As ordinarily constructed, a coffee milling roller is formed of a solid cylindrical mass of metal having a circumferential series of teeth cut upon its circumference with their edges parallel with the axis of the roller. As hereinafter described, I propose to substitute for such a roller, a hollow cylindrical shell having a circumferential series of teeth at its periphery with slots between them extending through said shell, and to supply the interior of said shell with compressed air which issues through said slots in such relation to the cutting faces of the teeth as to dislodge the coffee débris therefrom; the continued passage of air through said shell also serving to refrigerate the latter and thus maintain the coffee at the desired temperature during the operation of grinding it. As hereinafter described, I prefer to provide means to localize the air blast in such a ventilated roller so that the cleaning operation effected thereby does not interfere with the grinding operation.

Moreover, there are frequently included in the bags of crude coffee berries, which are packed at the coffee plantations, stones, nails etc., which, when presented with the coffee between the members of the milling couple, to wit, a roller of the character aforesaid and a serrated plate opposed thereto, break the teeth of the roller so that, if the teeth are in unitary relation with the roller, it is necessary to replace the entire roller to remedy such defect. Therefore, I find it advantageous to embody my invention in a roller including a body of tough metal having a circumferential series of teeth which are formed by respectively distinct blades which may be individually removed and replaced; so that the loss incident to the breaking of a single tooth in the roller is limited to the cost of replacement of that tooth instead of extending to the cost of replacement of the entire roller, as heretofore.

My invention includes the various novel features of construction and arrangement hereinafter more definitely specified.

In said drawing; Fig. I is a vertical sectional view of a grinding mill conveniently embodying my improvement.

Fig. II is a fragmentary cross sectional view of a milling cutter embodying a modified form of my invention.

Fig. III is a longitudinal sectional view showing the construction and arrangement of a milling cutter indicated in Fig. I.

Referring to Fig. I; the casing 1 has the upper opening 2 for the grist. The milling roller 6 includes a hollow cylindrical tubular shell which is rotatable upon a horizontal axis in said casing 1 and has teeth 7 which are ridges on its periphery, parallel with its axis. Said roller 6 is connected to turn with the shaft 9 which is journaled in any suitable manner in said casing 1; preferably in ball bearings. Said shell of the roller 6 has the cylindrical bore 10 concentric with its axis of rotation, and has a circumferential series of vent slots 11, extending from said bore through said shell, each local to one of said teeth 7 and preferably in alinement with the cutting face thereof.

The interior of said hollow shell 6 is supplied with compressed air which issues through said slots in such relation to the cutting faces of the teeth as to dislodge the coffee débris therefrom; the continued passage of air through said shell which is thus ventilated also serving to refrigerate the shell and thus maintain the coffee at the desired temperature during the operation of grinding it.

I find it convenient to introduce the compressed air to the bore 10 of said roller 6 through the tube 14 which is in coaxial relation with said roller, and prefer to localize the air blast in said roller, by means of the cylindrical shield 15 which is rotatably adjustable, with said tube 14, to which it is rigidly connected but may be held in stationary position with respect to said casing 1, in any desired position of rotary adjustment, conveniently by means engaging said tube 14 in rigid relation with said casing 1; so that the cleaning operation effected by the air blast through the longitudinal nozzle slot 16 in said shield 15 does not interfere with the grinding operation. That is to say; said milling roller 6 is carried by the shaft 9 which is journaled for rotation in said casing 1, at both sides of the latter, whereas, said tube 14, which extends in coaxial relation with said shaft 9, as indicated in Fig. I, is held stationary at one side of said casing 1 and holds said shield 15 stationary in its adjusted position, within the revoluble roller 6; so that said slots 11, in said roller 6, are adapted to successively register with said nozzle slot 16 in said shield 15, as said roller 6 turns.

Said casing 1 is provided with the milling plate 18 opposed to said milling roller 6 so that the grist is ground between them. Said plate 18 is hung upon the shaft 19, having its axis parallel to the axis of said roller 6, and I find it convenient to provide said plate 18 with a removable inner facing 20 which may be corrugated in any desired manner to cooperate with the teeth 7 of said roller 6 in the grinding operation.

The size of the particles to which the coffee or other material is ground is determined by the relative adjustment of the milling couple including said roller 6 and plate 18, and I find it convenient to effect such adjustment by the rotary cam 21 which bears against the abutment 22 on said plate 18, and is carried by the shaft 24, journaled in said casing 1 with its axis parallel to said roller 6.

Rotary adjustment of said cam 21, and consequent variation in the size of the particles of the material ground, may be conveniently effected by the hand wheel 26 which is rigidly mounted upon said shaft 24, exterior to said casing 1, and has a circumferential series of notches 27 in its rim which serve as a scale with reference to the index 28 on said casing and also successively engage the pawl spring 30 which prevents accidental movement of said cam from its adjusted position. I also find it desirable to provide for relative rotary adjustment of said cam 21 and the hand wheel 26; so as to calibrate the graduations upon the latter with reference to the throw of the cam to compensate for wear upon said abutment 22 incident to the continued vibration of said plate 18 during the grinding operation, and find it convenient to do so by rigidly securing said cam 21 upon said shaft 24, by the key 31, and adjustably securing said index wheel 26 upon said shaft by the set screw 32.

In the form of my invention above described with reference to Fig. I, the milling cutter teeth 7 are cheaply formed in unitary relation with the roller shell, which may be made entirely of steel hardened and tempered. However, as above noted with reference to the structures of the prior art; such unitary construction has the disadvantage that breakage of one or more teeth of the roller may necessitate replacement of the entire roller. Therefore, it is advantageous to form a ventilated roller in accordance with my invention, as indicated in Fig. II, wherein the hollow cylindrical tubular shell 36 may be formed of comparatively soft metal having its circumferential series of teeth 37 formed by respectively distinct blades of hardened and tempered steel, which may be individually removed and replaced in respective grooves 38 in said shell 36; so that the loss incident to the breaking of a single tooth 37 in the roller 36 is limited to the cost of replacement of that tooth, instead of extending to the cost of replacement of the entire roller, as in the form of my invention shown in Fig. I. Said blades 37 may be frictionally held in their respective recesses in said roller and be driven to and from the position shown in Fig. II, or may be otherwise detachably secured in any convenient manner.

Of course, the air supplied under pressure to the milling rollers above contemplated may be compressed by a suitable fan 40 operatively connected with the means for rotating said rollers. However, the particular means for compressing the air is not of the essence of my invention.

As far as I am aware, it is broadly new to so construct and arrange a milling roller that it may be ventilated and refrigerated, aside from the cleaning effect of the blast of refrigerating fluid above contemplated. Therefore, I do not desire to limit myself to the precise details of construction and arrangement herein set forth, as it is obvious that various modifications may be made therein without departing from the essential features of my invention, as defined in the appended claims.

I claim:

1. In a grinding mill, the combination with a casing; of a hollow cylindrical milling roller, rotatable in said casing, and including a metallic tubular shell having a circumferential series of teeth at its periphery, formed by respectively distinct blades, which may be individually removed and replaced, each tooth having a cutting edge parallel with the axis of said roller; said shell having a series of ventilating slots, each local to one of said teeth, and in alinement with the cutting edge thereof; means arranged to supply compressed air to the interior of said shell, including a tube in coaxial relation with said roller; a shield extending within said shell in opposition to the slots therein and having a nozzle slot with which said roller slots are adapted to successively register as the roller turns; whereby said roller is ventilated, refrigerated and cleaned by the air blast issuing therefrom through said slots.

2. In a grinding mill, the combination with a casing; of a hollow cylindrical milling roller, rotatable in said casing, and including a metallic tubular shell having a circumferential series of teeth at its periphery, formed by respectively distinct blades, which may be individually removed and replaced, each tooth having a cutting edge parallel with the axis of said roller; said shell having a series of ventilating slots, each local to one of said teeth; and means arranged to supply compressed air to the interior of said shell, having a nozzle slot with which said roller slots are adapted to successively register as the roller turns; whereby said roller is ventilated, refrigerated and cleaned by the air blast issuing therefrom through said slots.

3. In a grinding mill, the combination with a casing; of a hollow cylindrical milling roller, rotatable in said casing, and including a metallic tubular shell having a circumferential series of teeth at its periphery, each tooth having a cutting edge parallel with the axis of said roller; said shell having a series of ventilating slots, each local to one of said teeth; and means arranged to supply compressed air to the interior of said shell, having a nozzle slot with which said roller slots are adapted to successively register as the roller turns; whereby said roller is ventilated, refrigerated and cleaned by the air blast issuing therefrom through said slots.

4. In a grinding mill, the combination with a casing; of a hollow cylindrical milling roller, rotatable in said casing, and including a metallic tubular shell having a circumferential series of teeth at its periphery, formed by respectively distinct blades, which may be individually removed and replaced; said shell having a series of ventilating slots, each local to one of said teeth; and means arranged to supply compressed air to the interior of said shell, having a nozzle slot with which said roller slots are adapted to successively register as the roller turns; whereby said roller is ventilated, refrigerated and cleaned by the air blast issuing therefrom through said slots.

5. In a grinding mill, the combination with a casing; of a hollow cylindrical milling roller, rotatable in said casing, and including a metallic tubular shell having a circumferential series of teeth at its periphery; said shell having a series of ventilating slots, each local to one of said teeth; and means arranged to supply compressed air to the interior of said shell, having a nozzle slot with which said roller slots are adapted to successively register as the roller turns; whereby said roller is ventilated, refrigerated and cleaned by the air blast issuing therefrom through said slots.

6. In a grinding mill, the combination with a casing; of a hollow milling roller, rotatable in said casing, and including a tubular shell having a circumferential series of teeth at its periphery; said shell having a series of ventilating slots, each local to one of said teeth; and means independent of said roller arranged to supply compressed air to the interior of said shell; whereby said roller is ventilated and refrigerated by the air blast issuing therefrom through said slots.

7. The combination with a hollow milling roller having a circumferential series of cutting blades extending parallel with its axis, each of said blades having a plane face substantially radial to the axis of said roller and terminating at the cutting edge of said blade; said roller having a circumferential series of narrow vent slots respectively local to each of said blades; each of said slots being bounded at one edge by the plane face of its respective blade; of means arranged to force air outwardly from said roller through said slots; and a cylindrical shield closely fitting the inner surface of said roller and having a longitudinal nozzle slot; said shield being arranged to prevent the escape of air from said roller except through the vent slots registered with said nozzle slot.

In testimony whereof, I have hereunto signed my name at Philadelphia, Pennsylvania, this twenty-six day of March, 1921.

JOHN W. TATUM.

Witnesses:
G. G. BURLINGAME,
MINNIE L. FRY.